United States Patent
Huang et al.

(10) Patent No.: US 12,039,987 B2
(45) Date of Patent: Jul. 16, 2024

(54) SPEECH DATA PROCESSING METHOD AND APPARATUS, ELECTRONIC DEVICE, AND READABLE STORAGE MEDIUM

(71) Applicant: Tencent Technology (Shenzhen) Company Limited, Guangdong (CN)

(72) Inventors: Jun Huang, Guangdong (CN); Yannan Wang, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 304 days.

(21) Appl. No.: 17/447,536

(22) Filed: Sep. 13, 2021

(65) Prior Publication Data
US 2022/0013133 A1    Jan. 13, 2022

Related U.S. Application Data

(63) Continuation of application No. PCT/CN2020/105034, filed on Jul. 28, 2020.

(30) Foreign Application Priority Data

Sep. 23, 2019    (CN) .......................... 201910900060.1

(51) Int. Cl.
*G10L 21/02*    (2013.01)
*G10L 15/02*    (2006.01)

(52) U.S. Cl.
CPC .............. *G10L 21/02* (2013.01); *G10L 15/02* (2013.01)

(58) Field of Classification Search
CPC ................................ G10L 21/02; G10L 15/02
See application file for complete search history.

(56) References Cited

U.S. PATENT DOCUMENTS

| 9,058,820 B1 | 6/2015 | Mascaro et al. |
| 9,208,794 B1 | 12/2015 | Mascaro et al. |

(Continued)

FOREIGN PATENT DOCUMENTS

| CN | 109979478 A | 7/2010 |
| CN | 102800322 A | 11/2012 |

(Continued)

OTHER PUBLICATIONS

Written opinion dated Oct. 26. 2020, issued in corresponding application No. PCT/CN2020/105034.

(Continued)

*Primary Examiner* — Bhavesh M Mehta
*Assistant Examiner* — Edward Tracy, Jr.
(74) *Attorney, Agent, or Firm* — ArentFox Schiff LLP

(57) ABSTRACT

A speech data processing method is provided. In the method, first speech data is received from a sender. An initial speech enhancement parameter is obtained. Speech enhancement is performed on the first speech data based on the obtained initial speech enhancement parameter to obtain first speech enhancement data. A first speech enhancement parameter is determined based on the first speech data. The first speech enhancement data is transmitted to a recipient. Further, the obtained initial speech enhancement parameter is updated based on the first speech enhancement parameter to obtain an updated speech enhancement parameter. The first speech enhancement parameter can be used to perform speech enhancement on second speech data of the sender.

14 Claims, 3 Drawing Sheets

(56) References Cited

U.S. PATENT DOCUMENTS

| | | | |
|---|---|---|---|
| 2011/0307253 A1 | 12/2011 | Lloyd et al. | |
| 2015/0106088 A1* | 4/2015 | Jarvinen | G10L 21/0208 |
| | | | 704/233 |
| 2018/0190308 A1* | 7/2018 | Lou | H04R 3/005 |
| 2019/0287551 A1* | 9/2019 | Tsao | G10L 25/06 |
| 2019/0318725 A1* | 10/2019 | Le Roux | G10L 15/16 |

FOREIGN PATENT DOCUMENTS

| | | |
|---|---|---|
| CN | 103069480 A | 4/2013 |
| CN | 104952448 A | 9/2015 |
| CN | 106615533 A | 10/2018 |
| CN | 108877823 A | 11/2018 |
| CN | 109102823 A | 12/2018 |
| CN | 109273021 A | 1/2019 |
| CN | 109427340 A | 3/2019 |
| CN | 110648680 A | 1/2020 |
| CN | 110648681 A | 1/2020 |
| KR | 20190096305 A | 8/2019 |

OTHER PUBLICATIONS

International Search Report dated Oct. 26, 2020, issued in corresponding application No. PCT/CN2020/105034 (with English translation).

Chinese Office Action issued Jul. 31, 2023 in Application No. 201910900060.1, 23 pages.

Supplementary European Search Report issued May 11, 2022 in Application No. 20868291.4, 10 pages.

* cited by examiner

SPEECH DATA PROCESSING METHOD AND APPARATUS, ELECTRONIC DEVICE, AND READABLE STORAGE MEDIUM

RELATED APPLICATION

This application is a continuation of International Application No. PCT/CN2020/105034, entitled "SPEECH DATA PROCESSING METHOD AND APPARATUS, ELECTRONIC DEVICE AND READABLE STORAGE MEDIUM," and filed on Jul. 28, 2020, which claims priority to Chinese Patent Application No. 201910900060.1, entitled "SPEECH DATA PROCESSING METHOD AND APPARATUS, ELECTRONIC DEVICE, AND READABLE STORAGE MEDIUM" and filed on Sep. 23, 2019. The entire disclosures of the prior applications are hereby incorporated by reference in their entirety.

FIELD OF THE TECHNOLOGY

This application relates to the field of Internet technologies, and includes a speech data processing method and apparatus, an electronic device, and a computer-readable storage medium.

BACKGROUND OF THE DISCLOSURE

Speech enhancement includes speech noise reduction. Speeches acquired by a microphone are generally speeches with different noise, and a main objective of speech enhancement is to recover speeches without noise from speeches with noise. Various interfering signals may be effectively suppressed and a target speech signal may be enhanced through speech enhancement, thereby not only improving the speech intelligibility and speech quality, but also helping improve speech recognition.

When speech enhancement is performed on a speech to be processed, a universal noise reduction model is generated first through training, and adaptive training is then performed, for different speakers, on the entire noise reduction model or some layers in the model by using speech data corresponding to the speakers, to obtain noise reduction models corresponding to the different speakers respectively and store the noise reduction models. During actual application, corresponding noise reduction models are obtained for different speakers, and noise reduction processing is performed on speech data of the speakers by using the noise reduction models.

SUMMARY

Embodiments of this disclosure include a speech data processing method. In the method, first speech data is received from a sender. An initial speech enhancement parameter of a speech enhancement model is obtained based on the sender of the first speech data. Speech enhancement is performed on the first speech data based on the obtained initial speech enhancement parameter of the speech enhancement model to obtain first speech enhancement data. A first speech enhancement parameter of the speech enhancement model is determined based on the first speech data. The first speech enhancement data is transmitted to a recipient. Further, the obtained initial speech enhancement parameter of the speech enhancement model is updated based on the first speech enhancement parameter to obtain an updated speech enhancement parameter of the speech enhancement model for performing speech enhancement on second speech data of the sender.

The embodiments of this disclosure provide a speech data processing apparatus, including processing circuitry. The processing circuitry is configured to receive first speech data from a sender. The processing circuitry is configured to obtain an initial speech enhancement parameter of a speech enhancement model based on the sender of the first speech data. The processing circuitry is configured to perform speech enhancement on the first speech data based on the obtained initial speech enhancement parameter of the speech enhancement model to obtain first speech enhancement data. The processing circuitry is configured to determine a first speech enhancement parameter of the speech enhancement model based on the first speech data. The processing circuitry is configured to transmit the first speech enhancement data to a recipient. Further, the processing circuitry is configured to update the obtained initial speech enhancement parameter of the speech enhancement model based on the first speech enhancement parameter to obtain an updated speech enhancement parameter of the speech enhancement model for performing speech enhancement on second speech data of the sender.

The embodiments of this disclosure further provide an electronic device, including a processor, a memory, and a bus. The bus is configured to connect the memory and the processor. The memory is configured to store operating instructions. The processor is configured to invoke the operating instructions, the operating instructions causing the processor to perform the operations corresponding to the foregoing speech data processing method according to this disclosure.

The embodiments of this disclosure further provide a non-transitory computer-readable storage medium storing instructions which when executed by a processor cause the processor to perform the foregoing speech data processing method.

BRIEF DESCRIPTION OF THE DRAWINGS

To describe the technical solutions in the embodiments of this disclosure more clearly, the following briefly describes the accompanying drawings required for describing the embodiments of this disclosure.

DESCRIPTION OF EMBODIMENTS

Figure 1A:
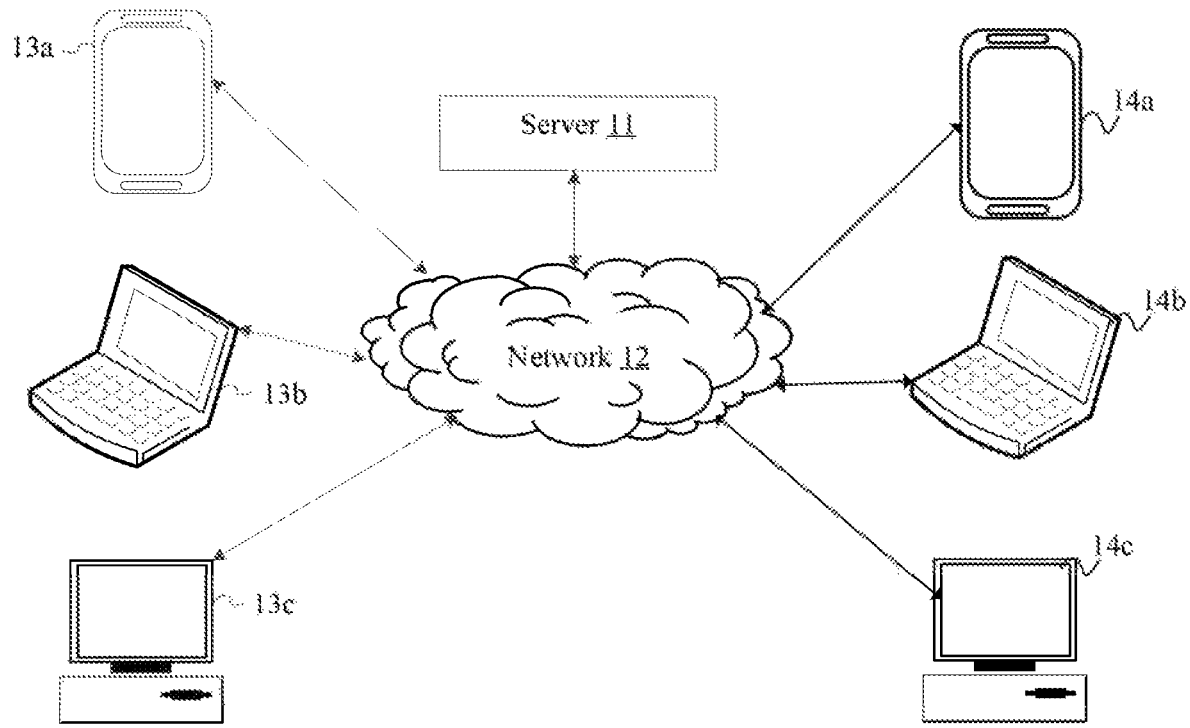
FIG. 1A is a diagram of a system architecture to which a speech data processing method is applicable according to an embodiment of this disclosure.

Embodiments of this disclosure are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are exemplary, and are only used to interpret this disclosure and should not be construed as a limitation to this disclosure.

A person skilled in the art may understand that, the singular forms "a", "an". "said", and "the" used herein may include the plural forms as well, unless the context clearly indicates otherwise. It is to be further understood that, the terms "include" and/or "comprise" used in this disclosure refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to the another element, or an intermediate element may exist. In addition, the "connection" or "coupling" used herein may include a wireless connection or a wireless coupling. The term "and/or" used herein includes all of or any of units and all combinations of one or more related listed items.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration, AI software technologies mainly include several major directions such as a computer vision (CV) technology, a speech processing technology, a natural language processing technology, and machine learning (ML) or deep learning.

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

To make the objectives, technical solutions, and advantages of this disclosure clearer, the following further describes implementations of this disclosure in detail with reference to the accompanying drawings.

As described above, when speech enhancement is performed on a speech to be processed, for different speakers, noise reduction models corresponding to the speakers need to be obtained, and noise reduction processing is performed on speech data of the speakers by using the noise reduction models. In this way, the noise reduction model corresponding to each speaker needs to be stored, which has a relatively high storage capacity requirement.

Embodiments of this disclosure provide a speech data processing method and apparatus, an electronic device, and a computer-readable storage medium, to resolve the foregoing technical problems in the related art.

The following describes the technical solutions of this disclosure and how to resolve the foregoing technical problems according to the technical solutions of this disclosure in detail by using exemplary embodiments. The following several exemplary embodiments may be combined with each other, and the same or similar concepts or processes may not be described repeatedly in some embodiments. The following describes the embodiments of this disclosure with reference to the accompanying drawings.

FIG. 1A is a diagram of a system architecture to which a speech data processing method is applicable according to an embodiment of this disclosure. Referring to FIG. 1A, the system architecture diagram includes a server 11, a network 12, and terminal devices 13a-13c and 14a-14c, where the server 11 establishes connections to the terminal devices 13a-13c and the terminal devices 14a-14c through the network 12.

In some examples of this disclosure, the server 11 is a backend server that receives speech data transmitted by a sender and then processes the received speech data. The server 11 provides services for a user together with one or more of the terminal devices 13a-13c and the terminal devices 14a-14c. For example, after processing speech data transmitted by the terminal device 13a (or the terminal device 14a) corresponding to the sender, the server 11 transmits obtained speech enhancement data to the terminal device 14a (or the terminal device 13a) corresponding to a recipient so as to provide the speech enhancement data to the user. The server 11 may be an independent server or may be a server cluster including a plurality of servers.

The network 12 may include a wired network and/or a wireless network. As shown in FIG. 1A, on a side of an access network, the terminal devices 13a-13c and the terminal devices 14a-14c may access the network 12 in a wireless or wired manner. On a side of a core network, the server 11 is usually connected to the network 12 in a wired manner. The server 11 may alternatively be connected to the network 12 in a wireless manner.

The terminal devices 13a-13c and the terminal devices 14a-14c may be smart devices having a data calculation processing function such as playing processed speech enhancement data provided by the server. The terminal devices 13a-13c and the terminal devices 14a-14c can include, but are not limited to, a smartphone (in which a communication module is installed), a palmtop computer, a tablet computer, or the like. Operating systems are respectively installed on the terminal devices 13a-13c and the terminal devices 14a-14c, which can include, but are not limited to, an Android operating system, a Symbian operating system, a Windows mobile operating system, and an Apple iPhone OS operating system.

Figure 1B:
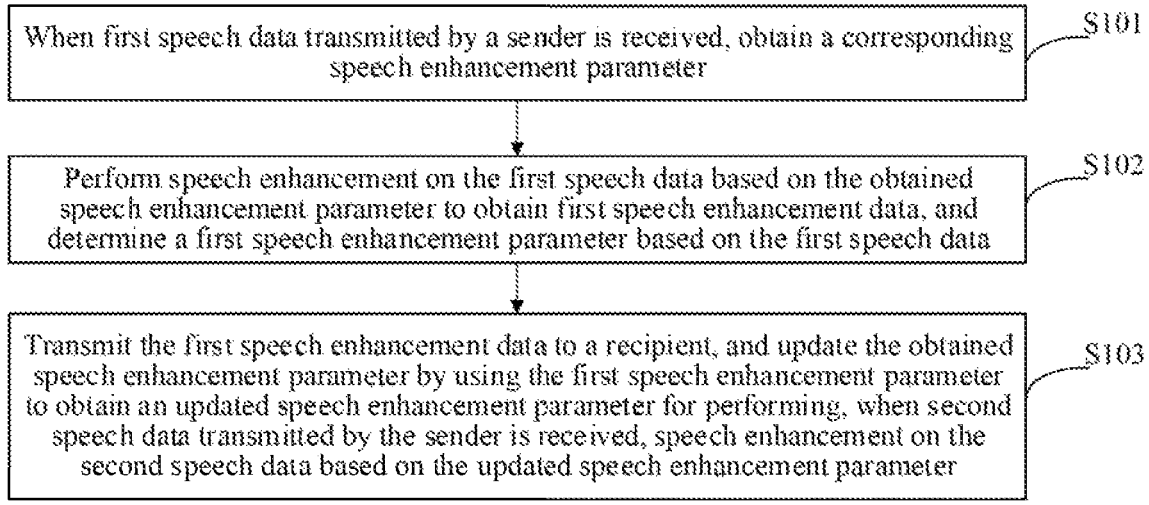
FIG. 1B is a schematic flowchart of a speech data processing method according to an embodiment of this disclosure.

Based on the system architecture diagram shown in FIG. 1A, an embodiment of this disclosure provides a speech data processing method, and the processing method is performed by the server 11 in FIG. 1A. As shown in FIG. 1B, the method can include the following steps.

In step S101, when first speech data transmitted by a sender is received, a corresponding speech enhancement parameter is obtained.

In some embodiments, in a process of obtaining the corresponding speech enhancement parameter, a pre-stored speech enhancement parameter corresponding to the sender is obtained; and when the speech enhancement parameter corresponding to the sender is not obtained, a preset speech enhancement parameter is obtained.

During actual application, this embodiment of this disclosure may be applicable to an application scenario based on network speech communication, such as a telephone conference or a video conference. The sender may be one party transmitting speech data. For example, if a user A makes a speech by using any of the terminal devices 13a-13c, the one of the terminal devices 13a-13c may be the sender, and speech content of the user A may be the first speech data. The first speech data is transmitted to the server through a network, and after receiving the first speech data, the server may obtain the corresponding speech enhancement parameter and further perform speech enhancement on the first speech data. A long short-term memory (LSTM) model may be run on the server, and the model may be used for performing speech enhancement on speech data.

In step S102, speech enhancement is performed on the first speech data based on the obtained speech enhancement parameter to obtain first speech enhancement data, and a first speech enhancement parameter is determined based on the first speech data.

In some embodiments, when the speech enhancement parameter corresponding to the sender is not obtained, speech enhancement is performed on the first speech data based on the preset speech enhancement parameter to obtain the first speech enhancement data.

In some embodiments, when the speech enhancement parameter corresponding to the sender is obtained, speech enhancement is performed on the first speech data based on the speech enhancement parameter corresponding to the sender to obtain the first speech enhancement data.

During actual application, when the speech enhancement parameter corresponding to the sender is not obtained, speech enhancement is performed on the first speech data based on the preset speech enhancement parameter; and when the speech enhancement parameter corresponding to the sender is obtained, speech enhancement is performed on the first speech data based on the speech enhancement parameter corresponding to the sender.

In some embodiments, when the speech enhancement parameter corresponding to the sender is not obtained, the performing speech enhancement on the first speech data based on the preset speech enhancement parameter to obtain the first speech enhancement data and determining a first speech enhancement parameter based on the first speech data includes: performing feature sequence processing on the first speech data by using a trained speech enhancement model to obtain a first speech feature sequence, the speech enhancement model being provided with the preset speech enhancement parameter; performing batch processing calculation on the first speech feature sequence by using the preset speech enhancement parameter to obtain a processed first speech feature sequence and the first speech enhancement parameter; and performing feature inverse transformation processing on the processed first speech feature sequence to obtain the first speech enhancement data.

In some embodiments, when the speech enhancement parameter corresponding to the sender is obtained, the performing speech enhancement on the first speech data based on the speech enhancement parameter corresponding to the sender to obtain the first speech enhancement data and determining a first speech enhancement parameter based on the first speech data includes: performing feature sequence processing on the first speech data by using a trained speech enhancement model to obtain a second speech feature sequence; performing batch processing calculation on the second speech feature sequence by using the speech enhancement parameter corresponding to the sender to obtain a processed second speech feature sequence and the first speech enhancement parameter; and performing feature inverse transformation processing on the processed second speech feature sequence to obtain processed second speech enhancement data, and using the processed second speech enhancement data as the first speech enhancement data.

In step S103, the first speech enhancement data is transmitted to a recipient, and the obtained speech enhancement parameter is updated by using the first speech enhancement parameter to obtain an updated speech enhancement parameter for performing, when second speech data transmitted by the sender is received, speech enhancement on the second speech data based on the updated speech enhancement parameter.

In some embodiments, when the speech enhancement parameter corresponding to the sender is not obtained, the obtained preset speech enhancement parameter is updated based on the first speech enhancement parameter to obtain the updated speech enhancement parameter, and the first speech enhancement parameter is used as the speech enhancement parameter corresponding to the sender.

In some embodiments, when the speech enhancement parameter corresponding to the sender is obtained, the speech enhancement parameter corresponding to the sender is updated by using the first speech enhancement parameter to obtain the updated speech enhancement parameter.

For example, after the first speech enhancement parameter is determined based on the first speech data, when a storage container does not include the speech enhancement parameter corresponding to the sender, the first speech enhancement parameter may be used as the speech enhancement parameter corresponding to the sender and stored in the storage container; and when the storage container has stored the speech enhancement parameter corresponding to the sender, the first speech enhancement parameter may be used to replace the stored speech enhancement parameter. In addition, the server transmits the first speech enhancement data obtained through speech enhancement to the recipient, and the recipient plays the first speech enhancement data after receiving the first speech enhancement data.

In some embodiments, the trained speech enhancement model is generated in the following manner: obtaining first speech sample data including noise and performing speech feature extraction on the rust speech sample data, to obtain a first speech feature; obtaining second speech sample data not including noise and performing speech feature extraction on the second speech sample data, to obtain a second speech feature; and training a preset speech enhancement model by using the first speech feature, to obtain a first speech feature outputted by the trained speech enhancement model, and calculating a similarity between the first speech feature obtained by training the speech enhancement model and the second speech feature until the similarity between the first speech feature obtained by training the speech enhancement model and the second speech feature exceeds a preset similarity threshold, to obtain the trained speech enhancement model.

In some embodiments, a manner of speech feature sequence extraction includes: performing speech framing and windowing on speech sample data to obtain at least two speech frames of the speech sample data; performing fast Fourier transformation on each of the speech frames to obtain discrete power spectra respectively corresponding to the speech frames; and performing logarithmic calculation on each of the discrete power spectra to obtain logarithmic power spectra respectively corresponding to the speech frames, and using the logarithmic power spectra as a speech feature sequence of the speech sample data.

In the embodiments of this disclosure, when first speech data transmitted by a sender is received, a corresponding speech enhancement parameter is obtained; speech enhancement is then performed on the first speech data based on the obtained speech enhancement parameter to obtain first speech enhancement data, and a first speech enhancement parameter is determined based on the first speech data; and then the obtained speech enhancement parameter is updated by using the first speech enhancement parameter to obtain an updated speech enhancement parameter for performing, when second speech data transmitted by the sender is received, speech enhancement on the second speech data based on the updated speech enhancement parameter, and the first speech enhancement data is transmitted to a recipient. In this way, the server may perform speech enhancement on speech data of the sender based on the speech enhancement parameter corresponding to the sender. Speech enhancement parameters corresponding to different senders are different, so that speech enhancement effects achieved by performing speech enhancement for the different senders are also different. In this way, when not requiring a plurality of models, speech enhancement is still targeted and only speech enhancement parameters need to be stored without storing a plurality of models, thereby having a relatively low storage capacity requirement.

The exemplary speech data processing method shown in FIG. 1B is described in detail in the embodiments of this disclosure.

In step S101, when first speech data transmitted by a sender is received, obtain a corresponding speech enhancement parameter.

During actual application, this embodiment of this disclosure may be applicable to an application scenario based on network speech communication, such as a telephone conference or a video conference. The sender may be one party transmitting speech data. For example, if a user A makes a speech by using one of the terminal devices 13a-13c, the one of the terminal devices 13a-13c may be the sender, and speech content of the user A may be the first speech data. The first speech data is transmitted to the server through a network, and after receiving the first speech data, the server may obtain the corresponding speech enhancement parameter and further perform speech enhancement on the first speech data.

A long short-term memory (LSTM) model may be run on the server, and the model may be used for performing speech enhancement on speech data.

Speech enhancement includes speech noise reduction. Speeches acquired by a microphone are generally speeches with different noise, and a main objective of speech enhancement is to recover speeches without noise from speeches with noise. Various interfering signals may be effectively suppressed and a target speech signal may be enhanced through speech enhancement, thereby not only improving the speech intelligibility and speech quality, but also helping improve speech recognition.

Figure 2:
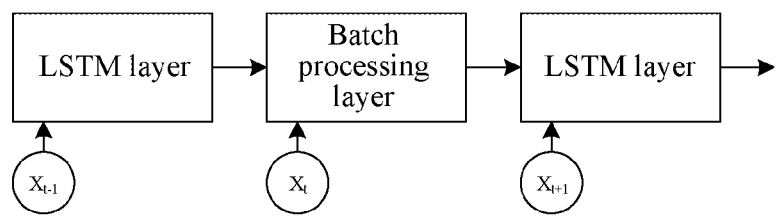
FIG. 2 is a schematic structural diagram of a long short-term memory (LSTM) model according to this disclosure.

A basic structure of the LSTM model may be shown in FIG. 2 and include a frontend LSTM layer, a batch processing layer, and a backend LSTM layer, where X is each frame of speech in speech data, and t is a time window.

One frame of speech refers to a short segment in a speech signal. For example, a speech signal is unstable macroscopically but stable microscopically and has short-term stability (e.g., the speech signal may be considered approximately unchanged within 10 ms to 30 ms). Therefore, the speech signal may be divided into some short segments for processing, and each short segment is referred to as one frame. For example, in a speech of is, if a length of one frame of speech is 10 ms, the speech includes 100 frames.

When the LSTM model processes speech data, the frontend LSTM layer, the batch processing layer, and the backend LSTM layer may perform calculation on speech frames in different time windows at the same time, where the batch processing layer is configured to calculate a speech enhancement parameter corresponding to the speech data, such as an average value and a variance.

Further, in the embodiments of this disclosure, the terminal devices 13a-13c and the terminal devices 14a-14c may further have the following features:

(1) In a hardware system, the device can include processing circuitry such as a central processing unit (CPU), a memory, an input part, and an output part. That is, the device is generally a microcomputer device having a communication function. In addition, there may further be a plurality of input manners such as a keyboard, a mouse, a touch screen, a transmitter, and a camera, and inputs may be adjusted as required. In addition, the device generally has a plurality of output manners such as a receiver and a display screen, which may also be adjusted as required.

(2) In a software system, the device can include an operating system such as Windows Mobile, Symbian, Palm, Android, or iOS. In addition, these operating systems are increasingly open, and personalized application programs developed based on these open operating system platforms emerge one after another, such as an address book, a calendar, a notepad, a calculator, and various games, thereby greatly meeting requirements of personalization users.

(3) In a communication capability, the device can have flexible access manners and high-bandwidth communication performance, and may automatically adjust a selected communication manner according to a selected service and an environment in which the device is located, so as to make it convenient for a user to use the device. The device may support Global System for Mobile Communications (GSM), Wideband Code Division Multiple Access (WCDMA), Code Division Multiple Access 2000 (CDMA2000), Time Division-Synchronous Code Division Multiple Access (TDSCDMA), Wi-Fi, and Worldwide Interoperability for Microwave Access (WiMAX), so as to adapt to a plurality of standard networks, thereby not only supporting a speech service, but also supporting a plurality of wireless data services.

(4) In function usage, the device can focus more on humanization, personalization, and multi-functionality. With the development of computer technologies, the device enters a "human-centered" mode from a "device-centered" mode, integrates embedded computing, control technologies. AI technologies, and biometric authentication technologies, and fully reflects the purpose of human-orientation. Due to the development of software technologies, the device may adjust settings according to personal requirements, which is more personalized. In addition, the device integrates lots of software and hardware, and functions are increasingly powerful.

In an exemplary embodiment of this disclosure, the obtaining a corresponding speech enhancement parameter can includes obtaining a speech enhancement parameter corresponding to the sender; and obtaining a preset speech enhancement parameter when the speech enhancement parameter corresponding to the sender is not obtained.

For example, after receiving the first speech data, the server may perform speech enhancement on the first speech data by using a trained LSTM model. The trained LSTM model is a universal model and includes a preset speech enhancement parameter, namely, a speech enhancement parameter in the trained LSTM model. The trained LSTM model may perform speech enhancement on speech data of any user.

In the embodiments of this disclosure, to provide targeted speech enhancement for different users, the trained LSTM model may be trained by using speech data of a user to obtain a speech enhancement parameter of the user. In this way, when speech enhancement is performed on speech data of the user, speech enhancement may be performed on the speech data of the user by using the speech enhancement parameter of the user.

For example, the trained LSTM model is trained by using speech data of a user A, to obtain a speech enhancement parameter of the user A. When speech enhancement is performed on subsequent speech data of the user A, the trained LSTM model may perform speech enhancement by using the speech enhancement parameter of the user A.

Therefore, when first speech data of a user is received, the server may first obtain a speech enhancement parameter of the user. In the embodiments of this disclosure, speech enhancement parameters corresponding to users may be stored in a storage container (e.g., a memory) of the server, or may be stored in a storage container of another device, which is not limited in the embodiments of this disclosure.

If the server has not obtained the speech enhancement parameter of the user, it indicates that the server receives the speech data of the user for the first time, and the server obtains a preset speech enhancement parameter in this case.

In step S102, speech enhancement is performed on the first speech data based on the obtained speech enhancement parameter to obtain first speech enhancement data, and a first speech enhancement parameter is determined based on the first speech data.

During actual application, when the speech enhancement parameter corresponding to the sender is not obtained, speech enhancement is performed on the first speech data based on the preset speech enhancement parameter; and when the speech enhancement parameter corresponding to the sender is obtained, speech enhancement is performed on the first speech data based on the speech enhancement parameter corresponding to the sender.

In an exemplary embodiment of this disclosure, when the speech enhancement parameter corresponding to the sender is not obtained, the step of performing speech enhancement on the first speech data based on the obtained speech enhancement parameter to obtain first speech enhancement data, and determining a first speech enhancement parameter based on the first speech data includes performing feature sequence processing on the first speech data by using a trained speech enhancement model to obtain a first speech feature sequence, the speech enhancement model being provided with the preset speech enhancement parameter; performing batch processing calculation on the first speech feature sequence by using the preset speech enhancement parameter to obtain a processed first speech feature sequence; and performing feature inverse transformation processing on the processed first speech feature sequence to obtain the first speech enhancement data, and determining the first speech enhancement parameter based on the first speech data.

For example, if the speech enhancement parameter corresponding to the sender is not obtained, the first speech data may be inputted into the trained LSTM model. The trained LSTM model performs feature sequence processing on the first speech data to obtain a first speech feature sequence corresponding to the first speech data, where the first speech feature sequence includes at least two speech features; then performs batch processing calculation on the first speech feature sequence by using the preset speech enhancement parameter to obtain a processed first speech feature sequence; and then performs feature inverse transformation processing on the processed first speech feature sequence to obtain the first speech enhancement data. That is, speech enhancement is performed on the first speech data by using the trained LSTM model (universal model). The batch processing calculation may be performed by using the following formula (1) and formula (2):

$$\hat{x}_i = \frac{x_i - \mu_B}{\sqrt{\sigma_B^2 + \varepsilon}}; \text{and} \qquad \text{Formula (1)}$$

$$y_i \gamma \hat{x}_i + \beta, \qquad \text{Formula (2)}$$

$\mu_B$ is an average value in the speech enhancement parameter, $\sigma_B^2$ is a variance in the speech enhancement parameter, $x_i$ is an inputted speech feature, $y_i$ is a speech feature outputted after speech enhancement, and $\varepsilon$, $\gamma$, and $\beta$ are variable parameters.

In addition, the trained LSTM model can be trained by using the first speech data to obtain the first speech enhancement parameter, namely, the speech enhancement parameter corresponding to the sender, and the first speech enhancement parameter is then stored. The trained LSTM model may be trained by using the following formula (3) and formula (4):

$$\mu_B = \frac{1}{m} \sum_{j=1}^{m} x_i; \text{and} \qquad \text{Formula (3)}$$

$$\sigma_B^2 = \frac{1}{m} \sum_{j=1}^{m} (x_i - \mu_B)^2, \qquad \text{Formula (4)}$$

$\mu_B$ is the average value in the speech enhancement parameter, $\sigma_B^2$ is the variance in the speech enhancement parameter, $x_i$ is the inputted speech feature, and m is a quantity of speech features.

An execution sequence of performing speech enhancement on the first speech data based on the obtained speech enhancement parameter and determining a first speech enhancement parameter based on the first speech data may be sequential execution or parallel execution, may be adjusted according to an actual requirement during actual application, and is not limited in the embodiments of this disclosure.

In an exemplary embodiment of this disclosure, when the speech enhancement parameter corresponding to the sender is obtained, the step of performing speech enhancement on the first speech data based on the obtained speech enhancement parameter to obtain first speech enhancement data, and determining a first speech enhancement parameter based on the first speech data includes performing feature sequence processing on the first speech data by using a trained speech enhancement model to obtain a second speech feature sequence; performing batch processing calculation on the second speech feature sequence by using the speech enhancement parameter to obtain a processed second speech feature sequence; and performing feature inverse transformation processing on the processed second speech feature sequence to obtain processed second speech enhancement data, using the processed second speech enhancement data as the first speech enhancement data, and determining the first speech enhancement parameter based on the first speech data.

For example, if the speech enhancement parameter corresponding to the sender is obtained, the first speech data may be inputted into the trained LSTM model. The trained LSTM model performs feature sequence processing on the first speech data to obtain a second speech feature sequence corresponding to the first speech data, where the second speech feature sequence includes at least two speech features; then performs batch processing calculation on the second speech feature sequence by using the speech enhancement parameter corresponding to the sender to obtain a processed second speech feature sequence; and then performs feature inverse transformation processing on the processed second speech feature sequence to obtain second speech enhancement data. That is, the speech enhancement parameter in the trained LSTM model is replaced with the speech enhancement parameter corresponding to the sender. Speech enhancement is then performed on the second speech data by using an updated LSTM model. The batch processing calculation may also be performed by using the formula (1) and the formula (2), and details are not described herein again.

In addition, the updated LSTM model is trained by using the first speech data to obtain a speech enhancement parameter, namely, the latest speech enhancement parameter corresponding to the sender, and the speech enhancement parameter is then stored. The updated LSTM model may also be trained by using the formula (3) and the formula (4), and details are not described herein again.

In an exemplary embodiment of this disclosure, the trained speech enhancement model is generated in the following manner.

First speech sample data including noise is obtained and speech feature extraction is performed on the first speech sample data, to obtain a first speech feature. Second speech sample data not including noise is obtained and speech feature extraction is performed on the second speech sample data, to obtain a second speech feature. A preset speech enhancement model is trained by using the first speech feature, to obtain a first speech feature outputted by the trained speech enhancement model, A similarity between the trained first speech feature and the second speech feature is calculated until the similarity between the trained first speech feature and the second speech feature exceeds a preset similarity threshold, to obtain the trained speech enhancement model.

For example, first speech sample data including noise is obtained, and speech feature extraction is performed on the first speech sample data, to obtain a first speech feature a. In addition, second speech sample data not including noise is obtained, and speech feature extraction is performed on the second speech sample data, to obtain a second speech feature b. The speech feature a is inputted into an original LSTM model, and the original LSTM model is unidirectionally trained by using the speech feature b as a training target, namely, all parameters in the LSTM model are unidirectionally adjusted, to obtain a trained first speech feature a', where the parameters include a speech enhancement parameter. A similarity between the trained first speech feature a' and the second speech feature b is then calculated until the similarity between the trained first speech feature a' and the second speech feature b exceeds a preset similarity threshold, to obtain the trained LSTM model.

The similarity may be calculated by using a similarity measure such as an included angle cosine or a Pearson correlation coefficient, or may be calculated by using a distance measure such as a Euclidean distance or a Manhattan distance. Another calculation manner may be alternatively used, and a specific calculation manner may be set according to an actual requirement, which is not limited in the embodiments of this disclosure.

In an exemplary embodiment of this disclosure, a manner of speech feature extraction includes: performing speech framing and windowing on speech sample data to obtain at least two speech frames of the speech sample data; performing fast Fourier transformation on each of the speech frames to obtain discrete power spectra respectively corresponding to the speech frames; and performing logarithmic calculation on each of the discrete power spectra to obtain logarithmic power spectra respectively corresponding to the speech frames, and using the logarithmic power spectra as speech features of the speech sample data.

Figure 3:
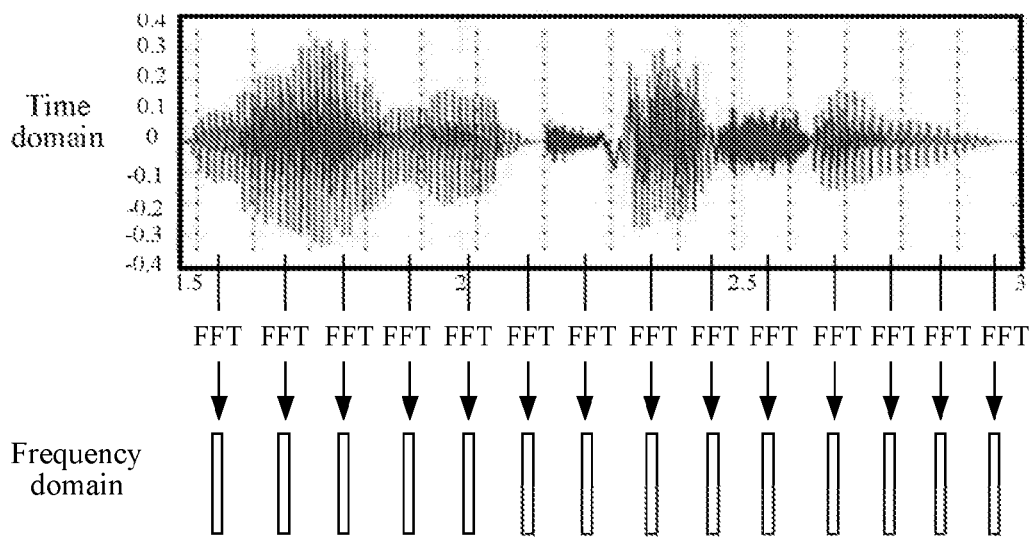
FIG. 3 is a schematic diagram of logical steps of speech feature extraction according to this disclosure.

For example, the speech sample data is a speech signal, and the speech signal is a time domain signal. A processor cannot directly process the time domain signal, so that speech framing and windowing need to be performed on the speech sample data, to obtain the at least two speech frames of the speech sample data, so as to convert the time domain signal into a frequency domain signal that may be processed by the processor, as shown in FIG. 3. Fast Fourier transformation (FFT) is then performed on each speech frame to obtain the discrete power spectra corresponding to the speech frames, and logarithmic calculation is then performed on the discrete power spectra to obtain the logarithmic power spectra respectively corresponding to the speech frames, so as to obtain the speech features respectively corresponding to the speech frames. A set of all the speech features is a speech feature sequence corresponding to the speech sample data. Feature inverse transformation processing is performed on the speech feature sequence, to convert the speech feature sequence in a frequency domain into a speech signal in a time domain.

A manner in which feature extraction is performed on the first speech sample data and a manner in which feature extraction is performed on the second speech sample data are the same. Therefore, for ease of description, the first speech sample data and the second speech sample data are collectively referred to as speech sample data in the embodiments of this disclosure.

In step S103, the first speech enhancement data is transmitted to a recipient, and the obtained speech enhancement parameter is updated by using the first speech enhancement parameter to obtain an updated speech enhancement parameter for performing, when second speech data transmitted by the sender is received, speech enhancement on the second speech data based on the updated speech enhancement parameter.

Generally, when a noise reduction model corresponding to a speaker is obtained through training, adaptive training needs to be performed, and adaptive training requires a relatively large data volume, so that adaptive training requires a relatively long time and has a relatively low efficiency.

In the embodiments of this disclosure, it is only required to update the obtained speech enhancement parameter by using the first speech enhancement parameter to obtain the updated speech enhancement parameter. In this way, adaptive training does not need to be performed.

For example, after the first speech enhancement parameter is determined based on the first speech data, when a storage container does not include the speech enhancement parameter corresponding to the sender, the first speech enhancement parameter may be used as the speech enhancement parameter corresponding to the sender and stored in the storage container; and when the storage container has stored the speech enhancement parameter corresponding to the sender, the first speech enhancement parameter may be used to replace the stored speech enhancement parameter.

When the second speech data transmitted by the sender is received, speech enhancement may be performed on the second speech data based on the first speech enhancement parameter, namely, the updated speech enhancement parameter. In this way, the server may unidirectionally train the trained LSTM model continuously based on the latest speech data transmitted by the sender, to update the speech enhancement parameter corresponding to the sender continuously, so that a degree of matching between the speech enhancement parameter and the sender is increasingly high, and a speech enhancement effect for the sender is also increasingly good.

In addition, the server transmits the first speech enhancement data obtained through speech enhancement to the recipient, and the recipient plays the first speech enhancement data after receiving the first speech enhancement data.

An execution sequence in which the server updates the speech enhancement parameter and transmits the speech enhancement data may be a sequential sequence or a parallel sequence, may be set according to an actual requirement during actual application, and is not limited in the embodiments of this disclosure.

For ease of understanding, a detailed description is made by using the following example in the embodiments of this disclosure.

It is assumed that a user A, a user B, and a user C perform a telephone conference, a trained LSTM model is being run on a server, the trained LSTM model includes a universal speech enhancement parameter, and neither a storage container in the server nor another storage container includes a speech enhancement parameter of the user A.

In this case, after the user A speaks out a first statement, a terminal device corresponding to the user A transmits the first statement to the server. After receiving the first statement of the user A, the server searches for a speech enhancement parameter corresponding to the user A. The speech enhancement parameter of the user A cannot be obtained since neither the storage container of the server nor the another storage container includes the speech enhancement parameter of the user A. Therefore, the universal speech enhancement parameter of the trained LSTM model is obtained, and speech enhancement is performed on the first statement by using the universal speech enhancement parameter to obtain an enhanced first statement, and the enhanced first statement is transmitted to terminal devices corresponding to the user B and the user C. In addition, the trained LSTM model is unidirectionally trained by using the first statement, to obtain a first speech enhancement parameter of the user A and store the first speech enhancement parameter.

After the user A speaks out a second statement, the terminal device transmits the second statement to the server. After receiving the second statement of the user A, the server searches for the speech enhancement parameter corresponding to the user A. In this case, the speech enhancement parameter is found successfully, the first speech enhancement parameter of the user A is obtained, and the universal speech enhancement parameter in the trained LSTM model is replaced with the first speech enhancement parameter to obtain an updated LSTM model. Speech enhancement is then performed on the second statement by using the updated LSTM model to obtain an enhanced second statement, and the enhanced second statement is transmitted to the terminal devices corresponding to the user B and the user C. In addition, the updated LSTM model is unidirectionally trained by using the second statement, to obtain a second speech enhancement parameter of the user A, and the first speech enhancement parameter is replaced with the second speech enhancement parameter. For speech enhancement processes on subsequent statements, the rest may be deduced by analogy, and details are not described herein again.

In the embodiments of this disclosure, when first speech data transmitted by a sender is received, a corresponding speech enhancement parameter is obtained; speech enhancement is then performed on the first speech data based on the obtained speech enhancement parameter to obtain first speech enhancement data, and a first speech enhancement parameter is determined based on the first speech data; and then the obtained speech enhancement parameter is updated by using the first speech enhancement parameter to obtain an updated speech enhancement parameter for performing, when second speech data transmitted by the sender is received, speech enhancement on the second speech data based on the updated speech enhancement parameter, and the first speech enhancement data is transmitted to a recipient. In this way, the server may perform speech enhancement on speech data of the sender based on the speech enhancement parameter corresponding to the sender. Speech enhancement parameters corresponding to different senders are different, so that speech enhancement effects achieved by performing speech enhancement for the different senders are also different. In this way, when not requiring a plurality of models, speech enhancement is still targeted and only speech enhancement parameters need to be stored without storing a plurality of models, thereby having a relatively low storage capacity requirement.

Further, the server may further unidirectionally train the trained LSTM model continuously based on the latest speech data transmitted by the sender, to update the speech enhancement parameter corresponding to the sender continuously, so that a degree of matching between the speech enhancement parameter and the sender is increasingly high, and a speech enhancement effect for the sender is also increasingly improved. In addition, in the continuous unidirectional training process, only the speech enhancement parameter needs to be trained, and it is unnecessary to train the entire trained LSTM model or an entire layer in the model, thereby reducing training costs and improving a training speed.

Figure 4:
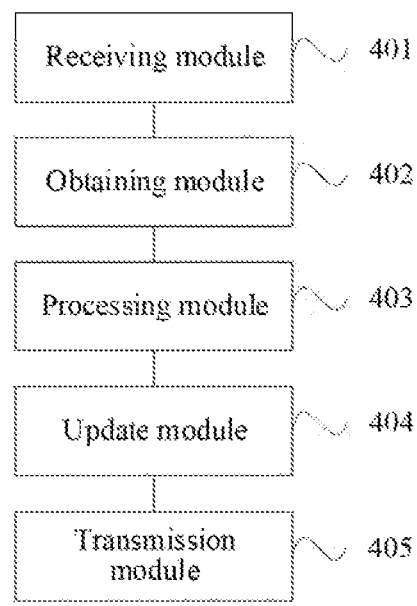
FIG. 4 is a schematic structural diagram of a speech data processing apparatus according to another embodiment of this disclosure.

FIG. 4 is a schematic structural diagram of a speech data processing apparatus according to another embodiment of this disclosure. As shown in FIG. 4, the apparatus of this embodiment may include a receiving module 401, an obtaining module 402, a processing module 403, an update module 404, and a transmission module 405. One or more modules, submodules, and/or units of the apparatus can be implemented by processing circuitry, software, or a combination thereof, for example.

The receiving module 401 is configured to receive first speech data transmitted by a sender. The obtaining module 402 is configured to obtain a corresponding speech enhancement parameter. The processing module 403 is configured to perform speech enhancement on the first speech data based on the obtained speech enhancement parameter to obtain first speech enhancement data, and determine a first speech enhancement parameter based on the first speech data, an update module 404, configured to update the obtained speech enhancement parameter by using the first speech enhancement parameter to obtain an updated speech enhancement parameter for performing, when second speech data transmitted by the sender is received, speech enhancement on the second speech data based on the updated speech enhancement parameter. The transmission module 405 is configured to transmit the first speech enhancement data to a recipient.

In an exemplary embodiment of this disclosure, the obtaining module is specifically configured to obtain a pre-stored speech enhancement parameter corresponding to the sender; and obtain a preset speech enhancement parameter when the speech enhancement parameter corresponding to the sender is not obtained.

In some embodiments, when the speech enhancement parameter corresponding to the sender is not obtained, the update module is further configured to update the obtained preset speech enhancement parameter based on the first speech enhancement parameter to obtain the updated speech enhancement parameter, and use the first speech enhancement parameter as the speech enhancement parameter corresponding to the sender.

In some embodiments, when the speech enhancement parameter corresponding to the sender is obtained, the update module is further configured to update the speech enhancement parameter corresponding to the sender by using the first speech enhancement parameter to obtain the updated speech enhancement parameter.

In some embodiments, when the speech enhancement parameter corresponding to the sender is not obtained, the processing module is further configured to perform speech enhancement on the first speech data based on the preset speech enhancement parameter to obtain the first speech enhancement data.

In some embodiments of this disclosure, the processing module includes a feature sequence processing submodule, a batch processing calculation submodule, and a feature inverse transformation processing submodule.

When the speech enhancement parameter corresponding to the sender is not obtained, the feature sequence processing submodule is configured to perform feature sequence processing on the first speech data by using a trained speech enhancement model to obtain a first speech feature sequence, the speech enhancement model being provided with the preset speech enhancement parameter. The batch processing calculation submodule is configured to perform batch processing calculation on the first speech feature sequence by using the preset speech enhancement parameter to obtain a processed first speech feature sequence and the first speech enhancement parameter. The feature inverse transformation processing submodule is configured to perform feature inverse transformation processing on the processed first speech feature sequence to obtain the first speech enhancement data.

In some embodiments, when the speech enhancement parameter corresponding to the sender is obtained, the processing module is further configured to perform speech enhancement on the first speech data based on the speech enhancement parameter corresponding to the sender to obtain the first speech enhancement data.

In some embodiments of this disclosure, the processing module includes a feature sequence processing submodule, a batch processing calculation submodule, and a feature inverse transformation processing submodule.

When the speech enhancement parameter corresponding to the sender is obtained, the feature sequence processing submodule is configured to perform feature sequence processing on the first speech data by using a trained speech enhancement model to obtain a second speech feature sequence. The batch processing calculation submodule is configured to perform batch processing calculation on the second speech feature sequence by using the speech enhancement parameter to obtain a processed second speech feature sequence and a first speech enhancement parameter. The feature inverse transformation processing submodule is configured to perform feature inverse transformation processing on the processed second speech feature sequence to obtain processed second speech enhancement data, and use the processed second speech enhancement data as the first speech enhancement data.

In an exemplary embodiment of this disclosure, the trained speech enhancement model is generated in the following manner. First speech sample data including noise is obtained and speech feature extraction is performed on the first speech sample data, to obtain a first speech feature. Second speech sample data not including noise is obtained and speech feature extraction is performed on the second speech sample data, to obtain a second speech feature. A preset speech enhancement model is trained by using the first speech feature, to obtain a first speech feature outputted by the trained speech enhancement model. A similarity between the first speech feature obtained by training the speech enhancement model and the second speech feature is calculated until the similarity between the first speech feature obtained by training the speech enhancement model and the second speech feature exceeds a preset similarity threshold, to obtain the trained speech enhancement model.

In some exemplary embodiments of this disclosure, a manner of speech feature sequence extraction includes performing speech framing and windowing on speech sample data to obtain at least two speech frames of the speech sample data; performing fast Fourier transformation on each of the speech frames to obtain discrete power spectra respectively corresponding to the speech frames; and performing logarithmic calculation on each of the discrete power spectra to obtain logarithmic power spectra respectively corresponding to the speech frames, and using the logarithmic power spectra as a speech feature sequence of the speech sample data.

The speech data processing apparatus in this embodiment may perform the speech data processing method shown in the first embodiment of this disclosure, implementation principles are similar, and details are not described herein again.

In the embodiments of this disclosure, when first speech data transmitted by a sender is received, a corresponding speech enhancement parameter is obtained; speech enhancement is then performed on the first speech data based on the obtained speech enhancement parameter to obtain first speech enhancement data, and a first speech enhancement parameter is determined based on the first speech data; and then the obtained speech enhancement parameter is updated by using the first speech enhancement parameter to obtain an updated speech enhancement parameter for performing, when second speech data transmitted by the sender is received, speech enhancement on the second speech data based on the updated speech enhancement parameter, and the first speech enhancement data is transmitted to a recipient. In this way, the server may perform speech enhancement on speech data of the sender based on the speech enhancement parameter corresponding to the sender. Speech enhancement parameters corresponding to different senders are different, so that speech enhancement effects achieved by performing speech enhancement for the different senders are also different. In this way, when not requiring a plurality of models, speech enhancement is still targeted and only speech enhancement parameters need to be stored without storing a plurality of models, thereby having a relatively low storage capacity requirement.

Further, the server may further unidirectionally train the trained LSTM model continuously based on the latest speech data transmitted by the sender, to update the speech enhancement parameter corresponding to the sender continuously, so that a degree of matching between the speech enhancement parameter and the sender is increasingly high, and a speech enhancement effect for the sender is also increasingly improved. In addition, in the continuous unidirectional training process, only the speech enhancement parameter needs to be trained, and it is unnecessary to train the entire trained LSTM model or an entire layer in the model, thereby reducing training costs and improving a training speed.

An electronic device is provided in still another embodiment of this disclosure. The electronic device includes a memory and a processor, and at least one program is stored in the memory and is configured to, when executed by the processor, implement the following steps: in the embodiments of this disclosure, when first speech data transmitted by a sender is received, obtaining a corresponding speech enhancement parameter; then, performing speech enhancement on the first speech data based on the obtained speech enhancement parameter to obtain first speech enhancement data, and determining a first speech enhancement parameter based on the first speech data; and then, updating the obtained speech enhancement parameter by using the first speech enhancement parameter to obtain an updated speech enhancement parameter for performing, when second speech data transmitted by the sender is received, speech enhancement on the second speech data based on the updated speech enhancement parameter, and transmitting the first speech enhancement data to a recipient. In this way, the server may perform speech enhancement on speech data of the sender based on the speech enhancement parameter corresponding to the sender, Speech enhancement parameters corresponding to different senders are different, so that speech enhancement effects achieved by performing speech enhancement for the different senders are also different. In this way, when not requiring a plurality of models, speech enhancement is still targeted and only speech enhancement parameters need to be stored without storing a plurality of models, thereby having a relatively low storage capacity requirement.

Further, the server may further unidirectionally train the trained LSTM model continuously based on the latest speech data transmitted by the sender, to update the speech enhancement parameter corresponding to the sender continuously, so that a degree of matching between the speech enhancement parameter and the sender is increasingly high, and a speech enhancement effect for the sender is also increasingly improved. In addition, in the continuous unidirectional training process, only the speech enhancement parameter needs to be trained, and it is unnecessary to train the entire trained LSTM model or an entire layer in the model, thereby reducing training costs and improving a training speed.

Figure 5:
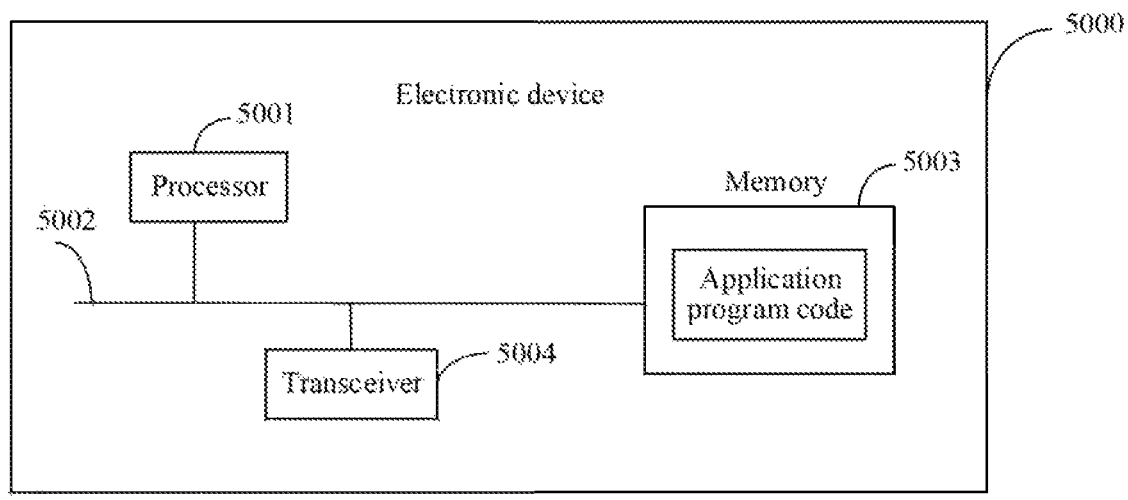
FIG. 5 is a schematic structural diagram of an electronic device for speech data processing according to still another embodiment of this disclosure.

In some embodiments, an electronic device is provided. As shown in FIG. 5, an electronic device 5000 shown in FIG. 5 includes a processor 5001 and a memory 5003. The processor 5001 and the memory 5003 are connected, for example, by a bus 5002. The electronic device 5000 may further include a transceiver 5004. During actual application, there may be one or more transceivers 5004. The structure of the electronic device 5000 does not constitute a limitation on this embodiment of this disclosure.

The processor 5001 may be processing circuitry such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in this disclosure. The processor 5001 may be alternatively a combination to implement a computing function, for example, may be a combination of one or more microprocessors, or a combination of a DSP and a microprocessor.

The bus 5002 may include a channel, to transmit information between the foregoing components. The bus 5002 may be a PCI bus, an EISA bus, or the like. The bus 5002 may be classified into an address bus, a data bus, a control bus, and the like. For ease of description, the bus in FIG. 5 is represented by using only one bold line, but which does not indicate that there is only one bus or one type of bus.

The memory 5003 may be a read-only memory (ROM) or another type of static storage device that can store static information and a static instruction; or a random access memory (RAM) or another type of dynamic storage device that can store information and an instruction; or may be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in the form of an instruction or a data structure and that is accessible by a computer, but is not limited thereto.

The memory 5003 is configured to store application program code for performing the solutions of this disclosure, and the application program code is executed under control of the processor 5001. The processor 5001 is configured to execute the application program code stored in the memory 5003 to implement the content shown in any one of the foregoing method embodiments.

The electronic device includes, but is not limited to, mobile terminals such as a mobile phone, a notebook computer, a digital broadcast receiver, a personal digital assistant (PDA), a portable Android device (PAD), a portable multimedia player (PMP), an in-vehicle terminal (such as an in-vehicle navigation terminal) and fixed terminals such as a digital television (TV) and a desktop computer.

According to still another embodiment of this disclosure, a computer-readable storage medium (e.g., a non-transitory computer-readable storage medium) is provided, storing a computer program, the computer program, when run on a computer, causing the computer to perform corresponding content in the foregoing method embodiments. In the embodiments of this disclosure, when first speech data transmitted by a sender is received, a corresponding speech enhancement parameter is obtained; speech enhancement is then performed on the first speech data based on the obtained speech enhancement parameter to obtain first speech enhancement data, and a first speech enhancement parameter is determined based on the first speech data; and then the obtained speech enhancement parameter is updated by using the first speech enhancement parameter to obtain an updated speech enhancement parameter for performing, when second speech data transmitted by the sender is received, speech enhancement on the second speech data based on the updated speech enhancement parameter, and the first speech enhancement data is transmitted to a recipient. In this way, the server may perform speech enhancement on speech data of the sender based on the speech enhancement parameter corresponding to the sender. Speech enhancement parameters corresponding to different senders are different, so that speech enhancement effects achieved by performing speech enhancement for the different senders are also different. In this way, when not requiring a plurality of models, speech enhancement is still targeted and only speech enhancement parameters need to be stored without storing a plurality of models, thereby having a relatively low storage capacity requirement.

Further, the server may further unidirectionally train the trained LSTM model continuously based on the latest speech data transmitted by the sender, to update the speech enhancement parameter corresponding to the sender continuously, so that a degree of matching between the speech enhancement parameter and the sender is increasingly high, and a speech enhancement effect for the sender is also increasingly improved. In addition, in the continuous unidirectional training process, only the speech enhancement parameter needs to be trained, and it is unnecessary to train the entire trained LSTM model or an entire layer in the model, thereby reducing training costs and improving a training speed.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of this disclosure. A person of ordinary skill in the art may make several improvements and refinements without departing from the principle of this disclosure, and the improvements and refinements shall fall within the protection scope of this disclosure.

What is claimed is:

1. A speech data processing method, comprising:
   receiving first speech data from a sender;
   obtaining a pre-stored speech enhancement parameter of a trained long short-term memory (LSTM) model corresponding to the sender of the first speech data;
   performing, by processing circuitry, speech enhancement on the first speech data by
      performing feature sequence processing on the first speech data by using the trained LSTM model to obtain a first speech feature sequence;
      performing batch processing calculation by a batch processing layer of the trained LSTM model on the first speech feature sequence by using the pre-stored speech enhancement parameter to obtain a processed first speech feature sequence and a first speech enhancement parameter corresponding to the sender; and
      performing feature inverse transformation processing on the processed first speech feature sequence to obtain first speech enhancement data;
   transmitting the first speech enhancement data to a recipient; and
   replacing the obtained pre-stored speech enhancement parameter of the trained LSTM model with the first speech enhancement parameter to obtain an updated speech enhancement parameter of the trained LSTM model without training the batch processing layer of the trained LSTM model, the updated speech enhancement parameter being configured for performing speech enhancement on second speech data of the sender.

2. The speech data processing method according to claim 1, wherein
   the pre-stored speech enhancement parameter corresponds to the sender; or
   the pre-stored speech enhancement parameter is a preset speech enhancement parameter when a pre-stored speech enhancement parameter corresponding to the sender is not available.

3. The speech data processing method according to claim 1, wherein
   the pre-stored speech enhancement parameter is a preset speech enhancement parameter; and
   the replacing the obtained pre-stored speech enhancement parameter includes replacing the obtained preset speech enhancement parameter with the first speech enhancement parameter to obtain the updated speech enhancement parameter.

4. The speech data processing method according to claim 1, wherein
   the replacing the obtained pre-stored speech enhancement parameter includes replacing the pre-stored speech enhancement parameter corresponding to the sender with the first speech enhancement parameter to obtain the updated speech enhancement parameter.

5. The speech data processing method according to claim 1, wherein
   the pre-stored speech enhancement parameter is a preset speech enhancement parameter, and
   the performing speech enhancement on the first speech data includes performing speech enhancement on the first speech data based on the preset speech enhancement parameter to obtain the first speech enhancement data.

6. The speech data processing method according to claim 1, wherein the LSTM model is trained by:
   obtaining first speech sample data including noise;
   obtaining second speech sample data not including noise and performing speech feature sequence extraction on the second speech sample data, to obtain a second training speech feature; and
   training a preset LSTM model by obtaining a first training speech feature outputted by the LSTM model, and calculating a similarity between the first training speech feature obtained by training the LSTM model and the second training speech feature until the similarity between the first training speech feature obtained by training the LSTM model and the second training speech feature exceeds a preset similarity threshold, to obtain the trained LSTM model.

7. The speech data processing method according to claim 6, wherein the speech feature sequence extraction comprises:
performing speech framing and windowing on speech sample data to obtain at least two speech frames of the speech sample data;
performing fast Fourier transformation on each of the speech frames to obtain discrete power spectra respectively corresponding to the speech frames; and
performing logarithmic calculation on each of the discrete power spectra to obtain logarithmic power spectra respectively corresponding to the speech frames, and using the logarithmic power spectra as a speech feature sequence of the speech sample data.

8. A speech data processing apparatus, comprising:
processing circuitry configured to:
receive first speech data from a sender;
obtain a pre-stored speech enhancement parameter of a trained long short-term memory (LSTM) model corresponding to the sender of the first speech data;
perform speech enhancement on the first speech data by
performing feature sequence processing on the first speech data by using the trained LSTM model to obtain a first speech feature sequence;
performing batch processing calculation by a batch processing layer of the trained LSTM model on the first speech feature sequence by using the pre-stored speech enhancement parameter to obtain a processed first speech feature sequence and a first speech enhancement parameter corresponding to the sender; and
performing feature inverse transformation processing on the processed first speech feature sequence to obtain first speech enhancement data;
transmit the first speech enhancement data to a recipient; and
replace the obtained pre-stored speech enhancement parameter of the trained LSTM model with the first speech enhancement parameter to obtain an updated speech enhancement parameter of the trained LSTM model without training the batch processing layer of the trained LSTM model, the updated speech enhancement parameter being configured for performing speech enhancement on second speech data of the sender.

9. The speech data processing apparatus according to claim 8, wherein
the pre-stored speech enhancement parameter corresponds to the sender; or
the pre-stored speech enhancement parameter is a preset speech enhancement parameter when a pre-stored speech enhancement parameter corresponding to the sender is not available.

10. The speech data processing apparatus according to claim 8, wherein
the pre-stored speech enhancement parameter is a preset speech enhancement parameter; and
the processing circuitry is configured to replace the obtained preset speech enhancement parameter with the first speech enhancement parameter to obtain the updated speech enhancement parameter.

11. The speech data processing apparatus according to claim 8, wherein
the processing circuitry is configured to replace the pre-stored speech enhancement parameter corresponding to the sender with the first speech enhancement parameter to obtain the updated speech enhancement parameter.

12. The speech data processing apparatus according to claim 8, wherein
the pre-stored speech enhancement parameter is a preset speech enhancement parameter, and
the processing circuitry is configured to perform speech enhancement on the first speech data based on the preset speech enhancement parameter to obtain the first speech enhancement data.

13. The speech data processing apparatus according to claim 8, wherein the LSTM model is trained by:
obtaining first speech sample data including noise;
obtaining second speech sample data not including noise and performing speech feature sequence extraction on the second speech sample data, to obtain a second training speech feature; and
training a preset LSTM model by obtaining a first training speech feature outputted by the LSTM model, and calculating a similarity between the first training speech feature obtained by training the LSTM model and the second training speech feature until the similarity between the first training speech feature obtained by training the LSTM model and the second training speech feature exceeds a preset similarity threshold, to obtain the trained LSTM model.

14. A non-transitory computer-readable storage medium storing instructions which when executed by a processor cause the processor to perform:
receiving first speech data from a sender;
obtaining a pre-stored speech enhancement parameter of a trained long short-term memory (LSTM) model corresponding to the sender of the first speech data;
performing speech enhancement on the first speech data by
performing feature sequence processing on the first speech data by using the trained LSTM model to obtain a first speech feature sequence;
performing batch processing calculation by a batch processing layer of the trained LSTM model on the first speech feature sequence by using the pre-stored speech enhancement parameter to obtain a processed first speech feature sequence and a first speech enhancement parameter corresponding to the sender; and
performing feature inverse transformation processing on the processed first speech feature sequence to obtain first speech enhancement data;
transmitting the first speech enhancement data to a recipient; and
replacing the obtained pre-stored speech enhancement parameter of the trained LSTM model with the first speech enhancement parameter to obtain an updated speech enhancement parameter of the trained LSTM model without training the batch processing layer of the trained LSTM model, the updated speech enhancement parameter being configured for performing speech enhancement on second speech data of the sender.

* * * * *